United States Patent [19]
Tanaka et al.

[11] Patent Number: 6,007,712
[45] Date of Patent: Dec. 28, 1999

[54] WASTE WATER TREATMENT APPARATUS

[75] Inventors: Eiji Tanaka, Okayama; Tamio Higashi, Tokyo-to; Takanori Kitamura, Kurashiki; Takeshi Matsuda; Hiroaki Fujii, both of Okayama; Naoshi Nakagawa, Tsukubo-gun; Shinji Komori, Yokohama; Tadao Shiotani, Suita; Masanobu Abe, Okayama, all of Japan

[73] Assignee: Kuraray Co., Ltd., Kurashiki, Japan

[21] Appl. No.: 09/030,002

[22] Filed: Feb. 25, 1998

[30] Foreign Application Priority Data

| Feb. 28, 1997 | [JP] | Japan | 9-045635 |
| Mar. 3, 1997 | [JP] | Japan | 9-048260 |
| Apr. 4, 1997 | [JP] | Japan | 9-086435 |
| May 30, 1997 | [JP] | Japan | 9-141305 |

[51] Int. Cl.$^6$ .................................................. C02F 3/10
[52] U.S. Cl. ................... 210/151; 210/195.2; 210/257.2; 210/616; 210/903
[58] Field of Search ........................... 210/150, 151, 210/195.1, 195.2, 195.3, 202, 257.2, 259, 616, 617, 903

[56] References Cited

U.S. PATENT DOCUMENTS

| 4,933,076 | 6/1990 | Oshima et al. | 210/151 |
| 5,204,001 | 4/1993 | Tonelli et al. | 210/151 |
| 5,254,253 | 10/1993 | Behmunn | 210/151 |
| 5,486,292 | 1/1996 | Bair et al. | 210/616 |
| 5,580,770 | 12/1996 | De Filippi | 210/616 |
| 5,876,603 | 3/1999 | Sumino et al. | 210/903 |

FOREIGN PATENT DOCUMENTS

| 61-209090 | 9/1986 | Japan . |
| 61-287500 | 12/1986 | Japan . |
| 62-186995 | 8/1987 | Japan . |

*Primary Examiner*—Christopher Upton
*Attorney, Agent, or Firm*—Oblon, Spivak, McClelland, Maier & Neustadt, P.C.

[57] ABSTRACT

A waste water treatment apparatus which is compact, and excellent in durability, has a high treatment performance and can stably operate for a long time is provided. In a waste water treatment apparatus at least comprising a waste water treatment tank in which a carrier particle immobilizing a microbe is charged and decomposing and eliminating an organic matter and/or an inorganic matter contained in a waste water, and a membrane module for filtrating a water to be treated which flows out from said treatment tank, a non-permeating water not passing thorough the membrane module is returned and circulated to said treatment tank. In a waste water treatment apparatus at least comprising a waste water treatment tank in which a carrier particle immobilizing a microbe is charged and decomposing and eliminating an organic matter and/or an inorganic matter contained in a waste water, a carrier immobilizing a microbe is an acetalized polyvinyl alcohol hydrogel.

16 Claims, 6 Drawing Sheets

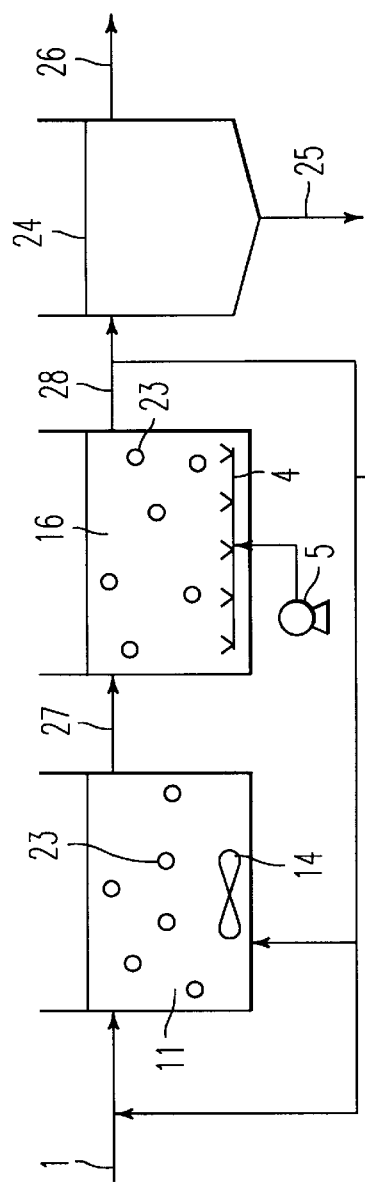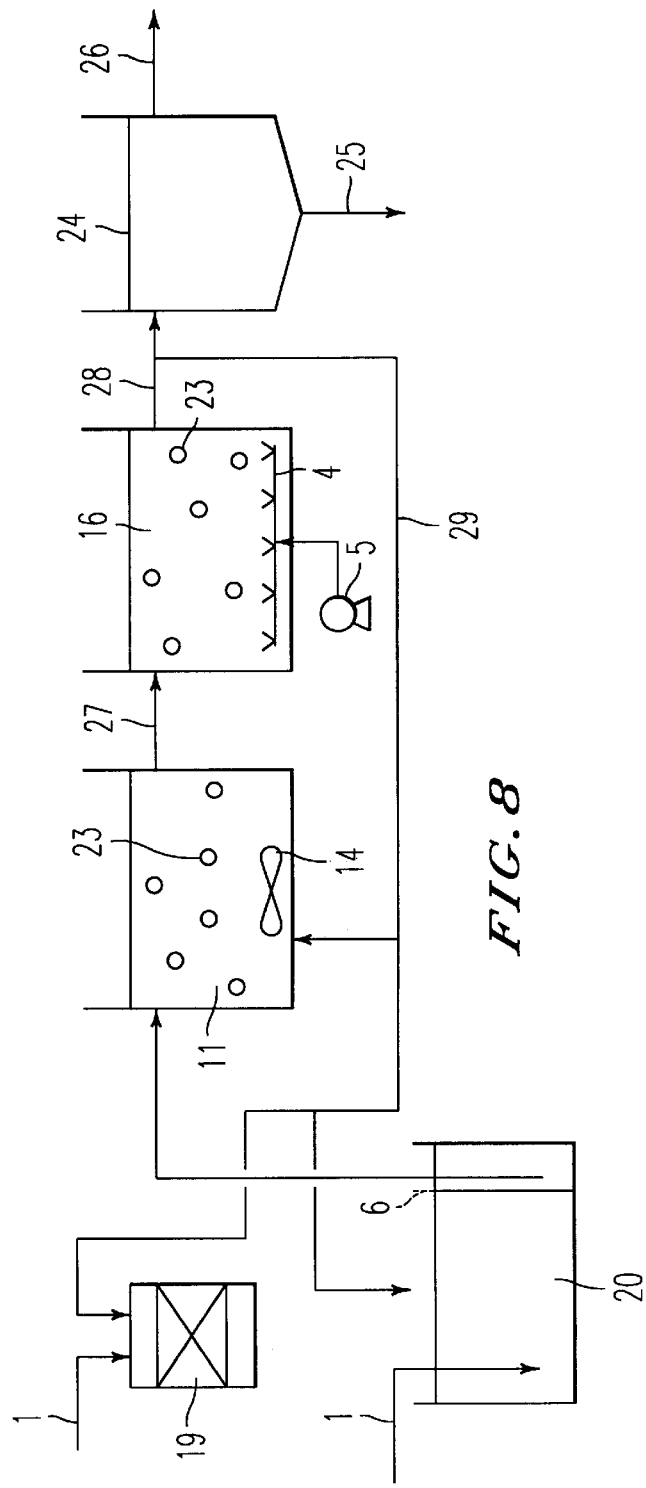
FIG. 7
FIG. 8

WASTE WATER TREATMENT APPARATUS

BACKGROUND OF THE INVENTION

1. Field of the Invention

The present invention relates to a waste water treatment apparatus for efficiently treat a waste water containing an organic matter and/or an inorganic matter. More particularly, the invention relates to a compact waste water treatment apparatus constituted by at least a waste water treatment tank comprising a denitrification tank and/or a nitrification tank to which a carrier particle immobilizing a microbe is charged and a membrane module, and a waste water treatment apparatus comprising at least a waste water treatment tank for decomposing and eliminating an organic matter and/or an inorganic matter contained in the waste water, in which a carrier formed by immobilizing a microbe to an acetalized polyvinyl alcohol hydrogel is charged to said waste water treatment tank.

2. Description of the Prior Art

Conventionally, an organic waste water including a nitrogenous substance such as a waste water in a farm village, a waste water for domestic use, an urban sewage, a waste water in a fish farming, and a waste water in various kinds of industries has been generally treated in accordance with an activated sludge method for purifying a polluted sludge by using an aerobic microbe and an anaerobic microbe. For example, as shown in FIG. 12, a waste water 1 is flowed into an anaerobic filtration tank 32, next, an oxidation of a BOD component and a nitrification of a nitrogenous substance by means of a nitrifying bacteria are performed under an aerobic condition in an aerobic filtration tank 33, a part of a treated water flowing out from the aerobic filtration tank 33 is circulated to the anaerobic filtration tank 32, a denitrification and elimination is performed by using denitrifying bacteria under an anaerobic condition, in the remaining flowing water from the aerobic filtration tank, the polluted sludge is settled and separated in a precipitation tank 34, and thereafter, a supernatant liquid 26 is discharged.

In the case of the conventional activated sludge method, a residence time of the waste water in an aeration tank is designed to be six to eight hours, however, an amount of the waste water recently tends to increase in correspondence to a variation of the industry and life, so that when a large amount of waste water is going to be treated in accordance with the activated sludge method by using the conventional treatment tank, an abnormality such as a bulking is generated because a residence time becomes short, and a satisfactory treatment can not be performed. Accordingly, in order to correspond to the treatment of a large amount of waste water, a new apparatus is required, so that a vast ground and an expensive building cost are required.

On the contrary, in view of elimination of a nitrogen, the conventional nitrogen elimination is performed by a treatment method constituted by introducing a water to be treated to the denitrification tank and the nitrification tank in the order, returning and circulating a part of the nitrified water flowing out from the nitrification tank to the denitrification tank, and sending the remaining nitrified water to a final precipitation pool, or a treatment method constituted by introducing to the nitrification tank and the denitrification tank in the order, and sending all amount of the denitrified water flowing out from the denitrification tank to a final precipitation pool. At this time, in the nitrification tank, a Kjeldahl nitrogen is oxidized to a nitrite nitrogen or a nitrate nitrogen, and in the denitrification tank, a nitrite nitrogen or a nitrate nitrogen is converted to a gaseous nitrogen so as to be eliminated, however, in these methods, it is general to eliminate a nitrogen by nitrifying and denitrifying by means of an activated sludge.

Even in the case that the waste water is treated by such a nitrogen eliminating method, a total residence time in the nitrification tank and the denitrification tank requires twelve to twenty-four hours on the basis of the flowing-in water, so that in a conventional sewage treatment plant having a purpose of only eliminating the BOD and designed to have a residence time of about six to eight hours, the residence time is insufficient and a satisfactory elimination of a nitrogen can not be performed. In order to correspond to a treatment of a lot of water, in the same manner as mentioned above, a new treatment apparatus is required, so that a vast ground and an expensive building cost are required.

On the contrary, in order to shorten a time for a treatment and make a treatment stable and a high level, with the object of increasing a concentration of a microbe within the waste water treatment tank and increasing a residence time of the microbe, a method of and an apparatus for treating by using a microbe carrier have been developed. As an example of this kind, in Japanese Patent Examined Publication No. 59-16516, there is disclosed a fluidized bed biological treatment method and an apparatus therefor which is structured such as to eliminate an organic matter contained in the waste water by fluidizing the carrier, and in Japanese Patent Examined Publication No. 63-52556, there is disclosed a method of biologically treating a waste water by charging a carrier in which an activated sludge is inclusively immobilized to a polymeric carrier in a waste water treatment tank and making them contact under a aerobic condition.

As another example, in Japanese Patent Examined Publication No. 1-37988, Japanese Patent Examined Publication No. 2-7716, Japanese Patent Unexamined Publication No. 4-310298, Japanese Patent Unexamined Publication No. 7-68282 and Japanese Patent Unexamined Publication No. 7-68287, there is disclosed a method of and an apparatus for treating a waste water using by charging a carrier in which a denitrifying bacteria and a nitrifying bacteria is inclusively immobilized to a polymeric carrier in an anaerobic filtration tank and an aerobic filtration tank.

In recent years, a consideration of making a waste water treatment apparatus compact by charging a carrier in which a microbe is attached and increased to a treatment tank has been promoted, so that granules such as various kinds of ceramics and plastics and a honeycomb construction body serving as a carrier have been developed. As a carrier used for a waste water treatment, an increase of a water content, an excellence of a permeability with respect to an oxygen and a substrate, and an increase of an affinity with an organism are required. In this view, there has been known a hydrogel obtained by, for example, a method of partially dehydrating a freezing portion after charging a polyvinyl alcohol aqueous solution (hereinafter, a polyvinyl alcohol is called PVA for short) into a mold (Japanese Patent Unexamined Publication No. 58-36630), a method of gelling by bringing a PVA aqueous solution into contact with a saturated boric acid aqueous solution ("Journal of Japan Sewage Works Association", Vol.23, p41(1986); "Journal of Water and Waste", Vol.30, p36 (1986)), a method of defrosting a freezing after a mixed aqueous solution of a PVA and a sodium alginate is brought into contact with a calcium chloride aqueous solution so as to spheroidize (Japanese Patent Unexamined Publication No. 64-43188), and a method of acetalizing by formaldehyde (Japanese Patent Unexamined Publication No. 7-41516).

On the contrary, in correspondence to a development of a membrane separating technology, a frequency of using a separating membrane has been increased for the purpose of increasing a quality of a treated water. As an example, in Japanese Patent Examined Publication No. 64-5960, there is disclosed a waste water treatment apparatus for performing a filtration treatment by communicating a hollow fiber membrane module with a bottom surface of a treatment tank, and in Japanese Patent Examined Publication No. 64-9071, there is disclosed a waste water treatment apparatus for performing a filtration treatment by arranging a hollow fiber membrane module above a treatment tank.

Further, a system for efficiently performing a waste water treatment by circulating a water to be treated is also considered, for example, in Japanese Patent Examined Publication No. 64-9074, there is disclosed a waste water treatment apparatus structured such that in a treatment tank comprising an anaerobic filtration tank and an aerobic filtration tank having a membrane module above aeration means, a part of a treated water from the aerobic filtration tank is returned to the anaerobic filtration tank.

However, in any of these, since the membrane module is provided within the treatment tank, the settling sludge treated by the polymeric carrier tends to be attached to the surface of the membrane and the portion between the hollow fiber membrane bundles, thereby clogging the pores of the membrane a load of a waste water flow amount can not be set to be a high value, so that a compactification of the apparatus has been limited. Further, a crack and a breakage have been easily generated by a geometrical effect of an attachment of a settling sludge to a membrane surface, a vibration by an air for an aeration and a collision of a carrier particle.

On the contrary, in a system of circulating a water to be treated, there is also disclosed an apparatus in which a membrane module is provided in an outer portion of a treatment tank, for example, in Japanese Patent Examined Publication No. 6-45035, there is disclosed a waste water treatment method constituted by at first treating a waste liquid in a bioreactor (I) using a denitrifying bacteria, next treating in a bioreactor (II) using a BOD oxidizing bacteria and a nitrifying bacteria, further introducing the treated liquid to a membrane separation apparatus, and respectively circulating a non-permeating liquid not passing through the membrane and a permeating liquid passing through the membrane to said bioreactor (II) and the bioreactor (I).

Further, in Japanese Patent Unexamined Publication No. 4-200697, there is disclosed a treatment apparatus for an organic waste water constituted by a circulating type organism treatment apparatus comprising an air lift type fluidized tank performing a treatment by fluidizing granulous microbe carrier and an expansion type fluidized tank, and a ultrafiltration membrane apparatus, and pressing a part of or all of the circulating water from the ultrafiltration membrane apparatus into a bottom portion of the expansion type fluidized bed.

However, in the method disclosed in Japanese Patent Examined Publication No. 6-45035, although the membrane module is disposed in the outer portion of the treatment tank, a concentration of a floating activated sludge containing a nitrifying bacteria is high, so that there is a disadvantage that the membrane is still easily closed. Further, in the treatment apparatus disclosed in Japanese Patent Unexamined Publication No. 4-200697, although a part of or all of the circulating water from the ultrafiltration apparatus is pressed into the bottom portion of the expansion type fluidized tank (the denitrification tank), the flow amount is limited in such a manner that the microbe carrier does not overflow, so that there is a disadvantage that a fluidity of the carrier is insufficient and a denitrification performance is deteriorated. Further, in the case that a circulating amount of the liquid is much, a concentration of a dissolved oxygen in the tank becomes high, so that the denitrification performance is deteriorated.

Each of the waste water treatment apparatus using the membrane mentioned above is useful for making the apparatus compact at a certain degree, however, in this kind of apparatus, as a combined purification tank is represented, a structure which is significantly compact, has an excellent durability and can increase a quality of the water to be treated has been required, but there has been yet no waste water treatment apparatus which satisfied the above points.

Further, in the waste water treatment, a bad smell is frequently generated, and this is pointed out as a new problem on environment. In the conventional waste water treatment method using the carrier, although a waste water treatment performance is sufficient, a bad smell can not be removed, so that a countermeasure such that a bad smell treatment apparatus is independently provided has been required. Accordingly, also in view of a bad smell, a carrier which does not make the apparatus big and is economically advantageous is desired.

SUMMARY OF THE INVENTION

Accordingly, an object of the present invention is to provide a waste water treatment apparatus which is compact and has an excellent durability, a high treatment performance and a long membrane life. Another object of the invention is to provide a waste water treatment apparatus which is compact and has an excellent durability and a high treatment performance. The other object of the invention is to provide a waste water treatment apparatus which is compact, has an excellent durability and a high treatment performance and can be applied to a waste water generating a bad smell.

The inventors have eagerly performed examination, and have found that the above object can be achieved by a waste water treatment apparatus having at least a waste water treatment tank in which a carrier particle immobilizing a microbe is charged and a membrane module for filtrating a water to be treated flowing out from the treatment tank, which is structured such as to return and circulate a non-permeating water which does not pass through the membrane module to said treatment tank, or by a waste water treatment apparatus in which at least an acetalized PVA hydrogel immobilizing a microbe is charged, or by using a microbe immobilizing carrier including an activated carbon, thereby obtaining the invention.

Accordingly, the present invention is a waste water treatment apparatus having at least a waste water treatment tank in which a carrier particle immobilizing a microbe is charged and decomposing and eliminating an organic matter and an inorganic matter contained in a waste water, and a membrane module for filtrating a water to be treated which flows out from said treatment tank, which is structured such as to return and circulate a non-permeating water which does not pass through the membrane module to said treatment tank.

Another aspect of the invention is a waste water treatment apparatus in which at least a carrier particle immobilizing a microbe is charged and comprising a waste water treatment tank for decomposing and eliminating an organic matter and/or an inorganic matter contained in a waste water, in which the carrier immobilizing a microbe is an acetalized PVA hydrogel.

The other aspect of the invention is a waste water treatment apparatus in which the carrier immobilizing a microbe includes an activated carbon on a surface and/or in an inner portion.

BRIEF DESCRIPTION OF THE DRAWINGS

FIG. 7 is a flow chart showing an embodiment of a waste water treatment apparatus in accordance with the invention in which a waste water treatment tank is structured such that a denitrification tank and a nitrification tank are arranged in the order from a waste water introduction side;

FIG. 8 is a flow chart showing an embodiment of a waste water treatment apparatus in accordance with the invention in which a waste water treatment tank is structured such that a denitrification tank and a nitrification tank are arranged in the order from a waste water introduction side and an anaerobic filtration apparatus or a first precipitation tank is disposed in front of the denitrification tank;

DETAILED DESCRIPTION OF THE PREFERRED EMBODIMENT

Figure 1:
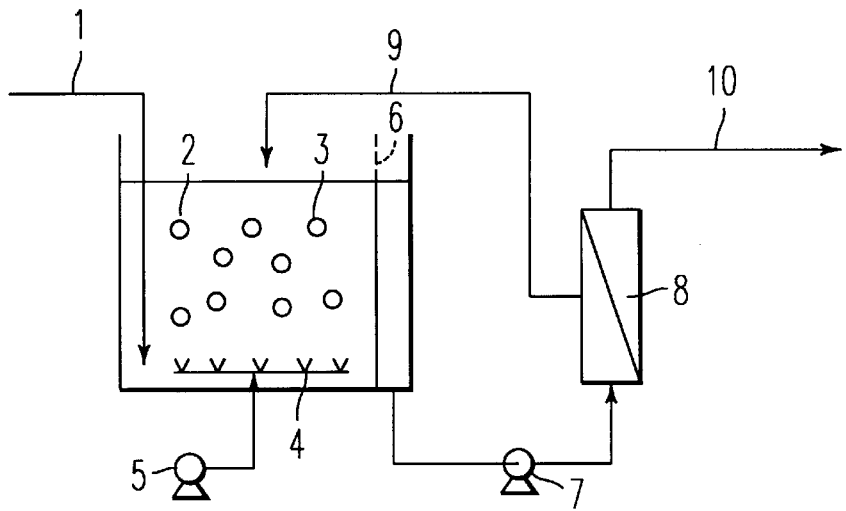
FIG. 1 is a flow chart which shows an embodiment of a waste water treatment apparatus in accordance with the invention.

A waste water treatment apparatus in accordance with the invention will be described below in further detail with reference to the attached drawings. FIG. 1 is a flow chart which shows an embodiment of a waste water treatment apparatus in accordance with the invention, and the waste water treatment apparatus is constituted by a waste water treatment tank in which a carrier particle immobilizing a microbe for decomposing and eliminating an organic and/or an inorganic contained in a waste water is charged, and a membrane module. The waste water treatment tank is constituted by a denitrification tank in which a carrier particle immobilizing a denitrifying bacteria is charged so as to bring into contact with a waste water under an anaerobic condition, and/or a nitrification tank in which a carrier particles immobilizing a nitrifying bacteria is charged so as to bring into contact with a waste water under an aerobic condition.

In the waste water treatment apparatus shown in FIG. 1, a waste water 1 including an organic matter and/or an inorganic matter is flowed into a waste water treatment tank 2. A carrier particle 3 immobilizing a microbe is charged in the waste water treatment tank 2, and the waste water is treated under an anaerobic condition or under an aerobic condition. FIG. 1 is an embodiment that an air diffuser 4 is provided in the waste water treatment tank 2. Reference numeral 5 denotes a blower for diffusing an air. In order to prevent a microbe immobilizing carrier from flowing out, it is preferable to provide a screen 6 in the waste water treatment tank. A water flowing out from the waste water treatment tank 2 is introduced to a membrane module 8 by a pump 7 in a cross flow method, and a non-permeating water which does not pass through the membrane is returned and circulated to the treatment tank from a returning line 9. A ratio of the non-permeating water against the permeating water is dependent upon a characteristic of the membrane is normally about five to ten times, although it can not unconditionally determined. The treated water permeating the membrane is further treated by a disinfection as occasion demands and is discharged as a treated water 10.

Figure 2:
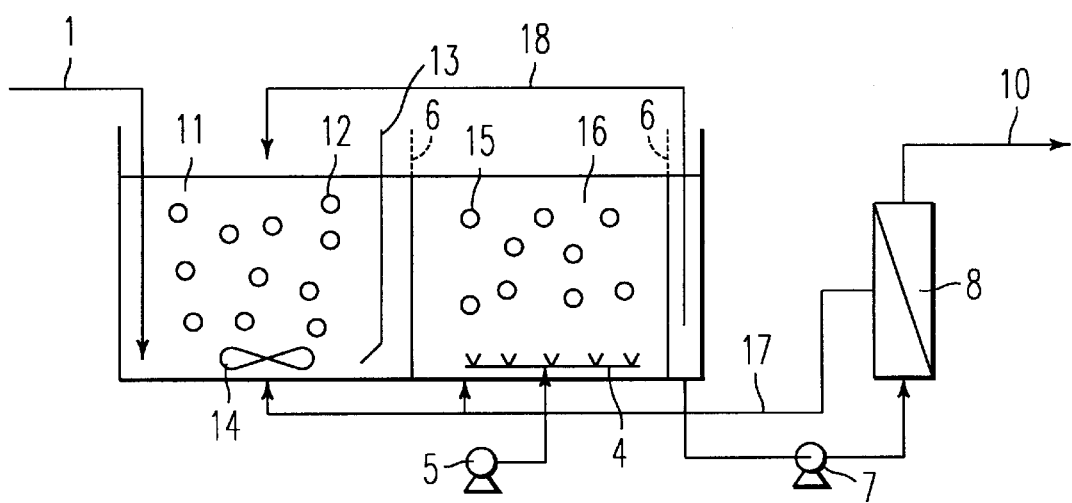
FIG. 2 is a flow chart showing an embodiment of a waste water treatment apparatus in accordance with the invention in which a waste water treatment tank is structured such that a denitrification tank and a nitrification tank are arranged in the order from a waste water introduction side.

FIG. 2 is a flow chart showing an embodiment structured such that the treatment tank is constituted by a denitrification tank 11 in which a carrier particle immobilizing a denitrification bacteria is charged so as to bring into contact with a waste water under an anaerobic condition, and a nitrification tank 16 in which a carrier particle immobilizing a nitrifying bacteria is charged so as to bring into contact with a waste water under an aerobic condition, that these treatment tanks are arranged in the order from an introduction side of the waste water, that a nitrified water which flows out from the nitrification tank is supplied to the membrane module 8, that a part of the nitrified water is returned and circulated to the denitrification tank, and that a non-permeating water which does not pass through the membrane module is returned and circulated to the nitrification tank and/or the denitrification tank.

In the waste water treatment apparatus shown in FIG. 2, the waste water 1 containing an organic matter and/or an inorganic matter is flowed into the denitrification tank 11. A carrier particle 12 immobilizing a denitrifying bacteria is charged in the denitrification tank 11, and the waste water is treated under an anaerobic condition. It is preferable to provide a baffle plate 13 in the denitrification tank so as to prevent the carrier particle and the sludge from flowing out, and it is effective and preferable that a front end portion of the baffle plate within the tank is bent. In the denitrification tank 11, since the carrier particle in which the denitrifying bacteria is immobilizing is fluidized by an agitating apparatus 14 disposed in a bottom portion of the denitrification tank 11, a fluidization of the carrier can be sufficiently secured, and a liquid is not flowed into over a necessary amount, so that a residence time can be increased.

Next, the denitrified water is flowed into the nitrification tank 16, and is treated under an aerobic condition. Reference numeral 4 denotes the air diffuser, reference numeral 5 denotes a blower for diffusing an air, and reference numeral 15 denotes a carrier particle immobilizing a nitrifying bacteria. As mentioned above, it is preferable to provide a screen in each of the tanks so as to prevent the carrier particle from flowing out. The nitrified water which is flowed out from the nitrification tank 16 is introduced to the membrane module 8 by the pump 7, and the non-permeating water which does not pass through the membrane is returned and circulated to the denitrification tank and/or the nitrification tank from a returning line 17. Further, a part of the nitrified water is returned and circulated to the denitrification tank 11 from a nitrified water returning line 18. Since a nitrate nitrogen is contained in the nitrified water, the waste water can be efficiently treated by returning a part thereof to the denitrification tank and performing a denitrification treatment. It is convenient to use an air lift pump (not shown) in order to return the nitrified water to the denitrification tank. In this case, when it is structured such that the nitrified water returned to the denitrification tank can be returned to the nitrification tank, an operation of controlling a flow amount can be made easy.

It is preferable to suitably change a returning rate of the nitrified water to the denitrification tank in correspondence to a nature of the waste water to be treated, however, it is normally performed at about one to five times of the permeating water through the membrane module. A rate of the non-permeating water with respect to the permeating water can not unconditionally determined because it depends upon a characteristic of a membrane however, it is normally about five to ten times. Further, a returning rate of the non-permeating water to the denitrification tank with respect to the nitrification tank is suitably determined in corresponded to a nature of the waste water, for example, it can be even. In the following, a returning rate between them in the waste water treatment apparatus in accordance with the invention using the membrane module is set in the same manner. The treated water passing through the membrane is further performed a disinfection as occasion demands, and is discharged as a treated water 10.

Figure 3:
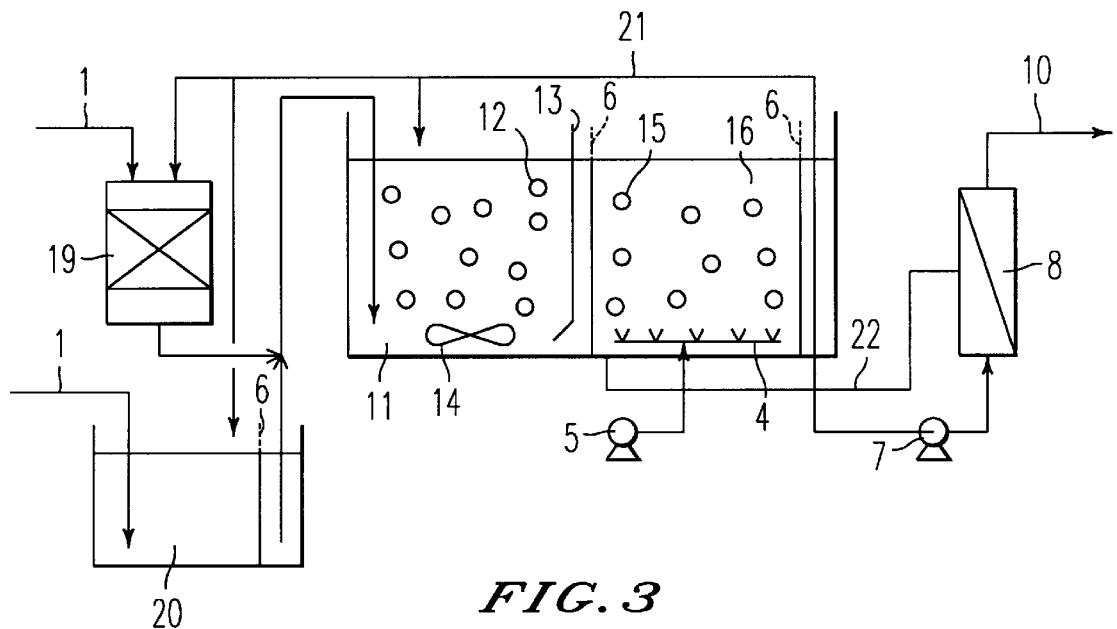
FIG. 3 is a flow chart showing an embodiment of a waste water treatment apparatus in accordance with the invention in which a waste water treatment tank is structured such that a denitrification tank and a nitrification tank are arranged in the order from a waste water introduction side and an anaerobic filtration apparatus or a first precipitation tank is disposed in front of the denitrification tank.

In the waste water treatment apparatus in accordance with the invention, it is further effective when an anaerobic filtration apparatus for performing an anaerobic treatment or a first precipitation tank is disposed in front of the denitrification tank. FIG. 3 is an embodiment in which an anaerobic filtration apparatus 19 or a first precipitation tank 20 is provided in front of the denitrification tank. Since a nitrate nitrogen is contained in the nitrified water, a part of the liquid is returned to the anaerobic filtration apparatus so as not to give a load to the membrane module, and an anaerobic filtration treatment and a denitrification treatment are performed. In this case, since a membrane life tends to be extended when the membrane module is disposed in an outer portion of the nitrification tank, it is preferable. The nitrified water is returned to the denitrification tank 11, or the anaerobic filtration apparatus 19, or the first precipitation tank 20 by a returning line 21, and the non-permeating water which does not pass through the membrane module is returned to the nitrification tank 16 by a non-permeating water returning line 22.

By returning and circulating the treated water in the above manner, a function of the immobilizing carrier can be sufficiently bought out, so that a further compact apparatus can be obtained. In accordance with this apparatus, since the excessively generating sludge becomes one several times of the case by a normal activated sludge method, a load of a sludge to the membrane module is decreased, a merit by arranging the membrane module in the outer portion can be sufficiently utilized, so that the life of the membrane can be extended. The returning rate from the nitrification tank to the anaerobic filtration apparatus can be normally changed in an optional manner in correspondence to a nature of the waste water, however, it is normally one to five times of the permeating liquid in the membrane module, and the returning rate of the non-permeating liquid to the nitrification tank in the membrane module is about one to ten times of the permeating liquid to be treated.

A floating matter contained in the waste water is removed in the anaerobic filtration apparatus 19, however, since the anaerobic bacterial is attached to the filtration material, an anaerobic treatment is also performed in the anaerobic filtration apparatus at the same time. Additionally, since a part of the nitrified water is circulated, it performs a part of a denitrification process, so that a volume of the denltriffication tank can be made small in comparison with the case of circulating the nitrified water to the denitrification tank. The filtration material used in the anaerobic filtration apparatus is not specially limited as far as it can eliminate the floating matter, for example, a fiber, a plastic and a molded product thereof can be used. These filtration material is preferably made an aspect having a small pressure loss and attaching a lot of microbes, and it is preferable to use a structure molded in a lattice shape.

In FIG. 3, in the case of using the anaerobic filtration appratus, the waste water 1 is at first introduced to the anaerobic filtration apparatus 19, and the floating matter is eliminated. In the anaerobic filtration tank 19, as mentioned above, since the anaerobic bacteria is attached to the filtration material, an anaerobic treatment is also performed at the same time. In the waste water treatment apparatus in accordance with the invention, the first precipitation tank may be disposed in front of the denitrification tank. In this case, the waste water 1 is introduced to the first precipitation tank 20, the floating matter contained in the waste water is previously precipitated here.

Figure 4:
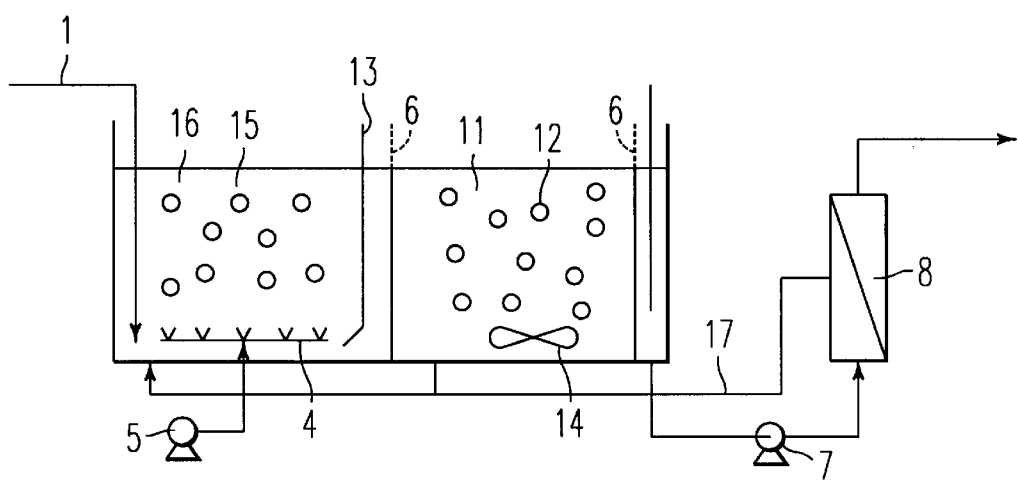
FIG. 4 is a flow chart showing an embodiment of a waste water treatment apparatus in accordance with the invention in which a waste water treatment tank is structured such that a nitrification tank and a denitrification tank are arranged in the order from a waste water introduction side.
Figure 5:
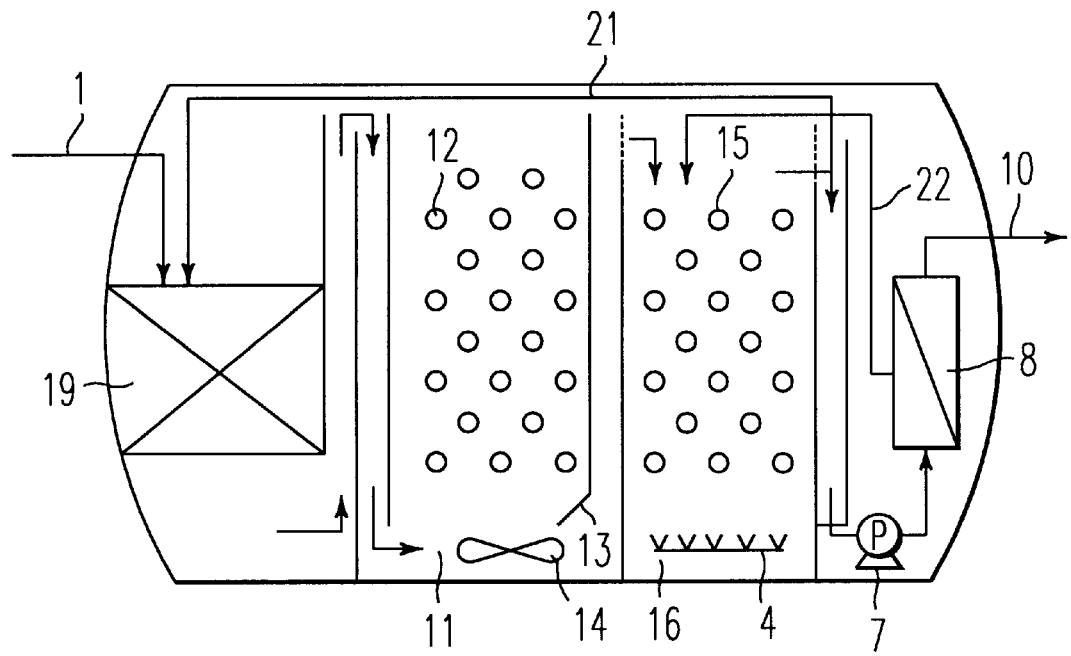
FIG. 5 is a view showing an embodiment of a waste water treatment apparatus in accordance with the invention in which the waste water treatment apparatus is a compact combined purification tank.

FIG. 4 is an embodiment in which the waste water treatment tank is constituted by a nitrification tank and a denitrification tank, and they are arranged in the order from the introduction side of the waste water. In this case, it is necessary to supply an organic carbon source to the denitrification tank for growing the denitrifying bacteria. In recent years, a combined treatment for treating a human waste and a waste water for domestic use at the same time is going to expand, however, not only a treatment of the BOD component, elimination of a nitrogen component for preventing rich-nutrition of a water area is going to be a big problem. The waste water treatment apparatus in accordance with the invention solves the problem, and a setting space can be made small, so that it is preferable for using a combined purification tank. FIG. 5 is an embodiment in which the waste water treatment apparatus in FIG. 3 is integrally formed as a combined purification tank. FIG. 5 is the embodiment in which the membrane module is disposed in an outer portion of the nitrification tank, and the nitrified water is pressed into the membrane module by the pump, however, it may be, of course, performed by a suction filtration or a gravity filtration. An illustration of the blower for diffusing an air to the nitrification tank is omitted.

The carrier immobilizing a microbe such as a denitrifying bacteria and a nitrifying bacteria is charged in the denitrification tank and/or the nitrification tank, however, a load of an SS component is decreased by using such a carrier. As a carrier for immobilizing a denitrifying bacterial and a nitrifying bacteria as a microbe, a vinyl alcohol resin, an acrylic resin, an acrylic amide resin, an olefin resin, a styrene resin, a polyurethane resin, a polysaccharide, a polyether, and a porous inorganic compound can be listed up, and concretely a polymer gel such as a PVA, a polyethylene glycol, a polyacrylamide, a calcium alginate, a carageenan, an agar and a photo-curing resin, an activated carbon, a polyurethane sponge, a polyacrylonitrile, a polyethylene, a polypropylene, a polystyrene, a cellulose derivative and a polyester can be exemplified.

As a carrier, in the case of attaching a bacteria, a polymer hydrogel is preferable in view of a BOD eliminating performance, a nitrifying performance and a denitrifying performance, and in the case of using the hydrogel, the hydrogel is in contact with the membrane surface by fluidizing in the treatment tank, so that an effect of cleaning a surface of the membrane is increased. Among them, since a PVA hydrogel has a mesh structure in the carrier surface and the inner portion, a microbe can easily live, and it is preferable since it is excellent in capturing of an organic compound and in a mechanical strength. Further, since a concentration of the PVA can be reduced when an average degree of polymerization and/or a degree of saponification of the PVA is increased, a water content of the gel can be increased, so that it is preferable since a livableness of the microbe is improved. Taking the above points into consideration, the average degree of polymerization of the PVA is preferably equal to or more than 1000, and more particularly the degree equal to or more than 1500 is further preferable. Further, the degree of saponification of the PVA is preferably equal to or more than 95 mole %, and more particularly the degree equal to or more than 98 mole % is further preferable.

Since it is preferable to set the concentration of the PVA high in view of a strength of a carrier, and is preferable to set to be low in view of a livableness of the microbe, it is preferable to set to be 1 wt % to 40 wt %, and it is more preferable to set to be 3 wt % to 20 wt %.

In order to prevent an elution and a deterioration of the PVA, it is desirable to acetalize the PVA. As an acetalizing agent, a formalin, a glutaraldehyde, a glyoxal, a terephthalic aldehyde and ω, ω'-nonanedial can be exemplified. A polyvinyl formal is a preferable example of this kind of acetalizing PVA. Since a waterproof is reduced when the acetalizing degree is too low, and a hydrophobic characteristic is promoted so that the livableness of the microbe is deteriorated when it is too high, a degree of 10 to 60 mole % is preferable, and a degree of 20 to 55 mole % is further preferable.

As an acid for acetalizing, an acid such as a sulfuric acid, a hydrochloric acid, a phosphoric acid, a nitric acid, an acetic acid and an oxalic acid, and an acid salt such as a sodium hydrogensulfate and an ammonium hydrogensulfate are used, however, under the condition in which an aldehyde compound and an acid exist, since there is a possibility that the hydrogel excessively swells and dissolves, a sodium sulfate having a coagulating function of the PVA can be added to the acetalizing liquid as an inhibitor.

Within a range which does not prevent the acetalizing of the PVA, for example, a molding assistant such as a sodium alginate, a carageenan and a boric acid, and a monovalent or polyvalent anion such as a carbonate ion, a hydrogencarbonate ion, a sulfate ion and a phosphoric ion performing a phase separation of two or more kinds of polymers may be added. Since the acetalizing PVA gel has a surface of an uneven structure and has finger-like voids orienting from the surface to a center portion, it is preferable for the microbe to live.

The acetalizing PVA hydrogel used for the invention has a hydroxyl group within a molecule, it indicates a hydrophilic property, so that a livableness of a microbe is high. The acetalizing PVA hydrogel is charged in the waste water treatment tank for treating the organic waste water under an aerobic condition, and the denitrification tank for biologically performing a denitrification under an anaerobic condition, and/or the nitrification tank for biologically performing a nitrification under an aerobic condition, so that the microbe present in the water to be treated is effectively attached, combined and immobilizing to the outer surface and the inner portion of the carrier. Since the acetalizing PVA hydrate gel is structured such that a specific gravity thereof becomes 1.00 to 1.05 when the attaching, combining and immobilizing of the microbe within the tank reach a stationary state, it can uniformly fluidize within the tank, so that it is preferable in view of a specific gravity.

The acetalizing PVA gel carrier is separated from the acetalizing liquid, and after a treatment such as a rinsing and a neutralization is performed, it becomes a carrier which can be used for a waste water treatment and a deodorization. The gel carrier may be temporarily dried. It becomes the hydrogel again when immersed in the water. The water content is preferably high, 50 to 99% in a humidity weight standard is preferable, and 60 to 98% is more preferable. A method of measuring a water content in a humidity weight standard is performed such that after immersing a carrier in a water having a temperature of 25° C. for 24 hours or more, a weight of a carrier except the surface attaching water is measured (a wet weight), and after drying this at a temperature of 105° C. for 4 hours, a weight is measured (a dry weight). A water content in a humidity weight standard is expressed as (wet weight−dry weight)/wet weight×100%.

The most preferable hydrogel is the PVA hydrogel having a surface layer comprising a net-like structure formed by entanglement of fiber-like articles having a diameter of 0.1 to 50 μm, which has been filed as Japanese Patent Application No.9-342047, and which corresponds to U.S. patent application Ser. No. 08/974,915, filed Nov. 20, 1997. This hydrogel corresponds to the acetalized PVA hydrogel having a surface comprising atleast 10(pieces/1-mm length on the surface) of recesses having an average diameter of 10 to 100 μm and a depth of 10 to 100 μm, and having a water content of at least 50% by weight. A method of producing the hydrogel is described in detail in the specification mentioned above, however, for example, by preparing a mixed aqueous solution comprising 8 wt % of PVA having an average degree of polymerization of 1700, a degree of saponification of 99.8 mole %, 1 wt % of sodium alginate and 0.3 wt % of sodium hydrogencarbonate, and dropping the aqueous solution to 0.1 mole/litter of calcium chloride, a spherical product is obtained, and thereafter, by immersing in an acetalizing aqueous solution comprising 20 g/litter of formaldehyde, 200 g/litter of sulfuric acid and 100 g/litter of sodium sulfate, the product can be obtained.

A shape of the carrier is not specially limited, and a shape molded in an optional manner such as a fiber shape, a dice shape, a membrane shape, a cylinder shape, a hollow cylindrical shape, a spherical shape and a disc shape can be used, however, a spherical shape is preferable in view of a fluidization of a carrier.

Since an activated carbon is excellent not only in an absorbing and eliminating performance of a decomposition retarding organic matter and a deodorizing performance which are inherently included therein, but also in a BOD eliminating performance, a denitrifying performance and a nitrifying performance by a microbe attached to an activated carbon and growing, it is a preferable carrier. When the activated carbon is used as a carrier, the activated carbon is regenerated by decomposing and eliminating the organic matter absorbed by the activated carbon by means of the microbe, so that the absorbing performance can be maintained for a long time, and further a load of the SS component is reduced. Further, the activated carbon has a good durability and wear and abrasion resistance. In the case of using by floating and fluidizing within the denitrification tank and/or the nitrification tank, an effect of cleaning the surface of the membrane is increased. But, the activated carbon is poor in fluidity compared with the other hydrogel. Besides, the activated carbon is apt to break by a sudden fluidizing. So, It had better be used by settling in the waste water treatment tank in order to bring out its high treatment performance. It may be a carrier including an activated carbon in a part of the carrier.

As an activated carbon, a structure made of a charcoal, a coal, a coke, a coconut meal, a resin and a petroleum pitch is used, however, a structure of activating the various kinds of raw carbide such as a ligneous group, a coal group, a resin group and a pitch group by a method such as a gas activating method, a steam activating method and a drug activating method is preferable. As an activating method, a method of activating by a zinc chloride or a phosphoric acid is effective and preferable.

As a quality of an activated carbon, a structure comprising 0.10 to 0.70 g/cm$^3$ of a filling specific gravity, preferably 0.15 to 0.60 g/cm$^3$, 300 to 2800 m$^2$/g of a specific surface, preferably 600 to 2500 m$^2$/g, 0.1 to 2.5 ml/g, preferably 0.5 to 2.0 ml/g of a pore volume in a range of 10 nm to 500 $\mu$m of a pore radius and 0.1 to 8 mm of a particle diameter is preferable. Among them, since a ligneous group has a mesh structure on the surface of the carrier and in the inner surface, a microbe is easily attached and is excellent in capturing an organic compound and a bad smell component, so that it is preferable. An activated carbon is apt to be broken by fluidizing. So, in order to bring the function of the activated carbon out sufficiently, the activated carbon is preferably employed as a fixed bed type.

The waste water frequently generates a bad smell, and in this case, it is preferable to use the carrier including an activated carbon. In order to produce this kind of carrier, for example, it is sufficient to prepare a mixed aqueous suspension comprising the carrier raw material such as the PVA, a molding assistant such as a sodium alginate and an activated carbon and to gel. A concentration of the aqueous suspension is not specially limited, however, in view of easily gelling, normally it is performed in 1 to 40 wt % of a carriage raw material, 0.1 to 5 wt % of amolding assistant and 0.1 to 5 wt % of an activated carbon. When the aqueous suspension is dropped in an aqueous solution of calcium chloride from a nozzle, a spherical gel can be obtained.

A distribution state of the activated carbon on the surface of the carrier and/or in the inner portion is not specially limited, however, a uniform distribution Is of course preferable. When a rate content of an activated carbon in a carrier is too small, a deodorizing effect is low, so that a structure of 0.5 to 5 wt % is preferable. In the case that the PVA gel is an acetalizing PVA gel, since the surface has an uneven structure and finger-like voids oriented from the surface to the center portion, not only the activated carbon on the surface but also the activated carbon in the inner portion can be effectively brought out, so that it is preferable.

A quality of the activated carbon contained in the carrier raw material is preferably structured such as to comprise 0.10 to 0.70 g/cm$^3$ of a filling specific gravity, preferably 0.15 to 0.60 g/cm$^3$, 300 to 2800 m$^2$/g of a specific surface, preferably 600 to 2500 m$^2$/g, 0.1 to 2.5 ml/g, preferably 0.5 to 2.0 ml/g of a pore volume in a range of 10 nm to 1 $\mu$m of a pore radius and 1 $\mu$m to 100 $\mu$m of a particle diameter. Among them, since a ligneous group has a net-like structure on the surface of the carrier and in the inner surface, a microbe is easily attached and is excellent in catching an organic compound and a bad smell component, so that it is preferable.

As a shape of an activated carbon, various shapes such as a particular form, a powder form and a fiber form can be used, however, a powder form is preferable so as to be uniformly present in the carrier. As an example of the activated carbon, KURARAYCOAL KW made by Kuraray Chemical Co.,Ltd., F400 made by Calgon Far East Co.,Ltd., BAC made by Kureha Chemical Industry Co.,Ltd. and FX-300 made by Toho Rayon Co.,Ltd. can be exemplified.

The carrier particle immobilizing a denitrifying bacteria and a nitrifying bacteria is filled in the denitrification tank and the nitrification tank, however, the same carrier particle may be used in each of the tanks, or the different carrier particle may be used there. For example, there are some cases such as a case in which a hydrogel such as a PVA is used in both of the denitrification tank and the nitrification tank, a case in which an activated carbon is used in both of the denitrification tank and the nitrification tank, a case in which an activated carbon is used in the denitrification tank and a hydrogel is used in the nitrification tank, and a case in which a hydrogel is used in the denitrification tank and an activated carbon is used in the nitrification tank, and these cases can be suitably performed as occasion demands. The denitrifying bacteria and the nitrifying bacteria can be used in a state of being previously immobilizing in the carrier particle, however, they can be used as a state of being naturally attached after charged the carrier particle in the tank.

A material of the separating membrane used for the membrane module is sufficient as far as it has a rigidity, for example, a resin such as a polysulfon group, a polyacrylonitrile group, a polyolefin group, a cellulose group, a polyamide group, a polyester group, a PVA group, a poly (meta)acrylic acid ester group and a polyimide group can be exemplified. In view of a separating performance, it is preferable to use a membrane in microfiltration area or ultrafiltration area.

When a hydrophilic membrane or a membrane made hydrophilic is used for the membrane module, a SS component is hard to be attached to the membrane and since it is easily eliminated by a back washing by means of an air and a permeating liquid when the SS component is attached, it is preferable. A vinyl alcohol group resin such as a PVA is a preferable example of a hydrophilic membrane Further, a membrane formed by making a hydrophobic resin such as a polysulfon group and a polyolefin group hydrophilic by a vinyl alcohol group resin such as a PVA may be used. Of course, a vinyl alcohol group resin can be used after acetalized.

Any shape such as a hollow fiber and a plate membrane can be used for these films, however, it is preferable in view of a operability and a compactification to use a structure having a hollow fiber, for example, a structure having an inner diameter of about 200 to 2500 $\mu$m is preferably used. A desired number of hollow fiber membrane modules are used in series or in parallel in accordance with a treating amount.

The membrane module may be used in a state of being immersed within the nitrification tank, or used in a state of being disposed in the outer portion of the nitrification tank. In the case that the membrane module is used in a state of being immersed within the nitrification tank, a nitrified water is normally performed by a suction filtration and a gravity filtration. In the case that the membrane module is used in a state of being disposed in the outer portion of the nitrification tank, a nitrified water may be pressed into by a pump or may be performed by a suction filtration and a gravity filtration. FIG. 1 shows an embodiment in which a membrane module is disposed in the outer portion of the nitrification tank and a nitrified water is pressed into by a pump. In the case that a hollow fiber membrane module is used for the membrane module, an internal pressure filtration method passing a water to be treated to an inner side of the hollow fiber or an external pressure filtration method passing a water to be treated to an outer side of the hollow fiber may be employed, however, when a cross flow method is employed, it is preferable since a clogging of the membrane is reduced.

Figure 6:
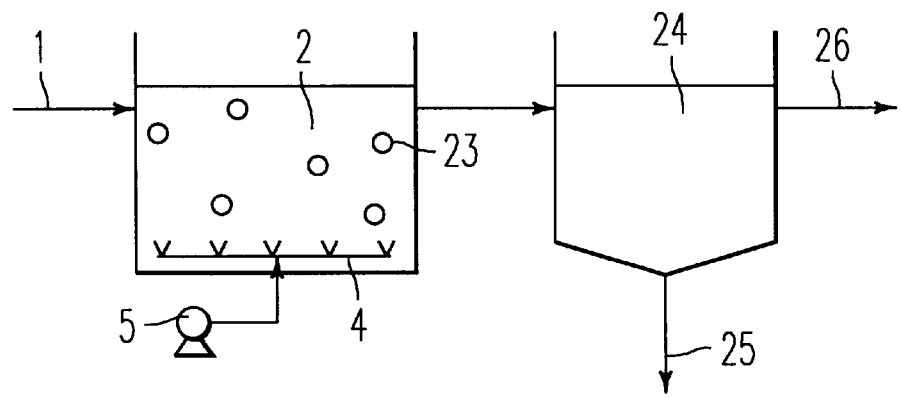
FIG. 6 is a flow chart which shows another embodiment of a waste water treatment apparatus in accordance with the invention.

FIG. 6 is a flow chart in accordance with the present invention which shows an embodiment of a waste water treatment apparatus at least comprising a waste water treatment tank in which a carrier particle immobilizing a microbe is charged and for decomposing and eliminating an organic matter and/or an inorganic matter contained in a waste water, in which structure immobilizing a microbe to an acetalized PVA hydrate gel is used as a carrier in the waste water treatment tank, and a case of decomposing and eliminating an organic matter contained in the waste water under an aerobic condition. Reference numeral 2 denotes a waste water treatment tank, and reference numeral 24 denotes a final precipitation tank. At first, a waste water 1 is supplied to the waste water treatment tank 2 from a first precipitation apparatus (not shown). An acetalized PVA hydrate gel 23 is previously charged in a waste water at a lower limit of an operation within the waste water treatment tank 2, and is fluidized by an air diffuser 4 disposed at a bottom portion of the waste water treatment tank 2. Reference numeral 5 denotes a blower connected to the air diffuser 4, which corresponds to drive means for the air diffuser 4. The waste water is biologically treated in the waste water treatment tank 2.

When an air is blown out from the air diffuser 4 while introducing the waste water 1 into the waste water treatment tank 2, as well as an oxygen is supplied to a mixed liquid within the waste water treatment tank 2, a circulating flow is generated in the treatment tank due to an ascending bubble current. A microbe for decomposing and eliminating an organic matter is attached, combined and immobilizing to the hydrogel 23 at a step that the acetalized PVA hydrogel 23 is fluidized within the waste water treatment tank 2 by this circulating current. Accordingly, the organic matter contained in the mixed liquid can be decomposed and eliminated in a significantly efficient manner and at a high speed as a result that the microbe and the organic matter are sufficiently in contact with each other. Further, the microbe immobilizing within the carrier is hard to be fallen out also when the acetalized PVA hydrogel 23 is fluidized in the mixed liquid. Various kinds of screens can be provided within the treatment tank so as to prevent the acetalized PVA hydrogel from overflowing.

The treated water after biologically treated is fed to the final precipitation tank 24, here an excessively generated sludge is drawn from a sludge discharging pipe 25, and a supernatant liquid 26 is discharged. The waste water treatment tank used for the waste water treatment apparatus in accordance with the invention can increase an efficiency of treating a waste water by using the acetalized PVA hydrogel, however, an effect of treating a waste water can be significantly improved by using a hydrogel formed by combining the conditions mentioned above with each other.

FIG. 7 is a flow chart showing another aspect in accordance with the invention in which a denitrification tank and a nitrification tank are arranged in the order from a side of introducing a water to be treated. Reference numeral 11 denotes a denitrification tank, and reference numeral 16 denotes a nitrification tank. When the waste water 1 is supplied to the denitrification tank 11, the waste water 1 is biologically denitrified by a microbe within the denitrification tank under an anaerobic condition (under no oxygen condition), and is fed to the nitrification tank 16 as a denitrified water 27. The denitrified water fed to the nitrification tank 16 is biologically nitrified by a microbe within the nitrification tank under an aerobic condition. A part of the nitrified water 28 is circulated and returned to the denitrification tank 11 through a returning line 29, and the remaining treated water is fed to the final precipitation tank 24, and is discharged as a supernatant liquid 26 after the sludge is precipitated. A returning rate of the nitrified water 28 to the denitrification tank 11 is about one to five times of the supernatant liquid 26. The generated sludge is drawn outside the system through the sludge discharging pipe 25.

An agitating apparatus 14 is provided within the denitrification tank 11, and a spherical acetalized PVA hydrogel 23 is charged into the mixed liquid containing the microbe within the denitrification tank 11. An organic carbon source is supplied to the denitrification tank as occasion demands.

The air diffuser 4 for supplying a gas containing an oxygen such as an air is disposed in a bottom portion within the nitrification tank 16 in such a manner as to connect to the blower 5, and the same spherical acetalized PVA hydrogel 23 as that used in the denitrification tank is charged in the mixed liquid containing a microbe within the nitrification tank 16. The acetalized PVA hydrogel may be used by being charged in both of the denitrification tank and the nitrification tank or may be used by being charged in any one thereof, however, since the case of using by being charged in both thereof is more efficient, it is normally used by being charged in both of the tanks. A different kind of acetalized PVA may be charged in each of the tanks.

In this apparatus, when the agitating apparatus 14 is operated in a state of flowing out the denitrified water 27 to the nitrification tank 16 while introducing the waste water 1 within the denitrification tank 11, the circulating current of the mixed liquid is generated within the denitrification tank 11, the acetalized PVA hydrogel 23 fluidizes within the denitrification tank 11 due to this circulating current, and during the time, the microbe mainly having a denitrifying bacteria present in the mixed liquid is attached, combined and immobilizing to the hydrogel 23. The mixed liquid within the tank is denitrified by this immobilizing denitrifying bacteria and a floating denitrifying bacteria. The organic matter contained in the mixed liquid is used as a breathing substrate for the denitrifying bacteria or a carbon source for combining a cell, however, as mentioned above, the carbon source may be added for the outside of the system as occasion demands.

In the nitrification tank 16, when the denitrified water 27 is supplied from the denitrification tank 11, and an air is blown out from the air diffuser 4 in a state that the nitrified water 28 within the nitrification tank 16 is flowed out, an oxygen is supplied to the mixed liquid within the nitrification tank 16, and during the circulating current of the mixed liquid is generated by the ascending bubble current at this time, the microbe mainly having the nitrifying bacteria present in the mixed liquid is attached, combined and immobilizing to the acetalized PVA hydrogel 23. The mixed liquid within the tank is biologically nitrified by the immobilizing nitrifying bacteria and the floating nitrifying bacteria.

Accordingly, the microbe is attached, combined and immobilizing on the surface and/or in the inner portion of the acetalized PVA hydrogel 23, so that a component to be treated and the microbe are sufficiently in contact with each other. Further, the microbe immobilizing within the carrier is hard to be fallen off even when the acetalized PVA hydrogel 23 is fluidized within each of the tanks. As a result, a nitrogen contained in the water to be treated is decomposed and eliminated at a significantly efficient manner and at a high speed. In order to prevent the hydrogel from overflowing out from the tank, it is of course to provide a screen in the denitrification tank and/or the nitrification tank.

FIG. 8 is another flow chart of the invention in which a denitrification tank and a nitrification tank are arranged in the order from a side of introducing a waste water and an anaerobic filtration apparatus or a first precipitation tank is disposed in front of the denitrification tank. The waste water 1 is biologically denitrified by a microbe within the denitrification tank under an anaerobic condition, and next, the denitrified water 27 is biologically nitrified by a microbe within the nitrification tank under an aerobic condition. As well as a part of the nitrified water 28 is circulated and returned to the denitrification tank 11 and the anaerobic filtration apparatus 19, or the first precipitation tank 20, the remaining nitrified water is fed to the final precipitation tank 24, and is discharged as a supernatant water 26 after the sludge is eliminated. A rate of the nitrifried water 28 returned to the denitrification tank 11 and the anaerobic filtration apparatus 19, or the first precipitation tank 20 with respect to the supernatant water 26 is about one to five times. The returning rate to the denitrification tank 11 and the anaerobic filtration apparatus 19 or the first precipitation tank 20 is suitably performed in accordance with a nature of the waste water. The same returning rate thereof is employed in the waste water treatment apparatus which does not use the membrane module in accordance with the invention. The generated sludge is removed out from the system through the sludge discharging pipe 25.

Figure 9:
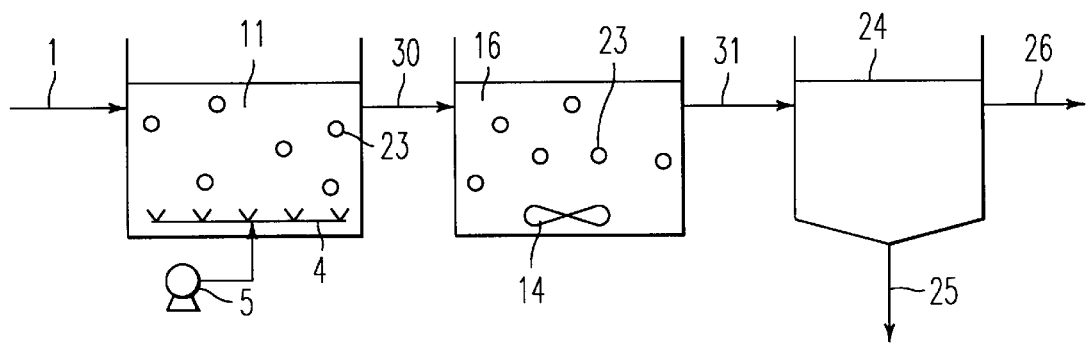
FIG. 9 is a flow chart showing an embodiment of a waste water treatment apparatus in accordance with the invention in which a waste water treatment tank is structured such that a nitrification tank and a denitrification tank are arranged in the order from a waste water introduction side.
Figure 10:
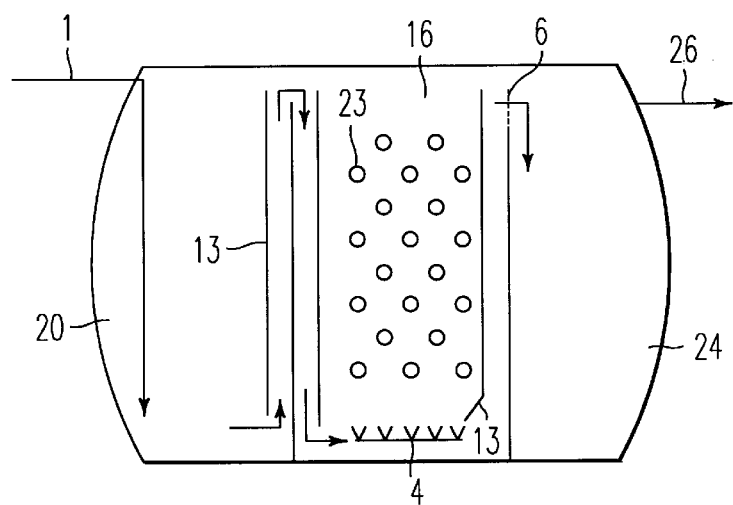
FIG. 10 is a view showing another embodiment of a waste water treatment apparatus in accordance with the invention in which the waste water treatment apparatus is a compact combined purification tank.
Figure 11:
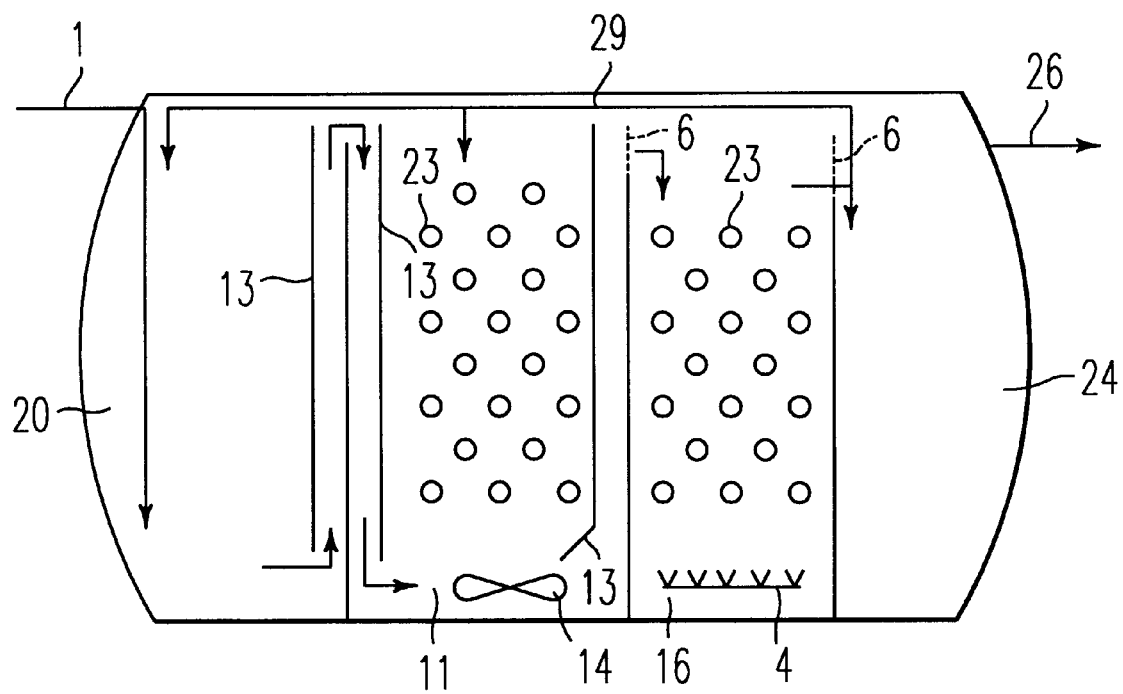
FIG. 11 is a view showing the other embodiment of a waste water treatment apparatus in accordance with the invention in which the waste water treatment apparatus is a compact combined purification tank.

FIG. 9 is the other flow chart in accordance with the invention in which a nitrification tank and a denitrification tank are arranged in the order from a side of introducing a waste water. The waste water 1 is biologically nitrified by a microbe within the nitrification tank under an aerobic condition, and next, the nitrified water 30 is biologically denitrified by a microbe within the denitrification tank under the anaerobic condition. The denitrified water 31 is fed to the final precipitation tank 24, and is discharged as a supernatant water 26 after the sludge is precipitated. The generated sludge is removed out from the system through the sludge discharging pipe 25. The waste water treatment apparatus mentioned above is preferable for a combined purification tank, FIG. 10 shows an embodiment in which the waste water treatment apparatus shown in FIG. 6 is made a combined purification tank by using a first precipitation tank, and FIG. 11 shows an embodiment in which the waste water treatment apparatus shown in FIG. 8 is made a combined purification tank by using a first precipitation tank. In this case, although the illustration is omitted, it is sufficient that the sludge layered on the final precipitation tank is suitably returned to the first precipitation tank and discharged from the first precipitation tank.

The invention will be concretely described below with reference to an embodiment, however, the invention is not limited to these.

REFERENCE EXAMPLE 1

A mixed aqueous solution containing 8% by weight of a PVA (1700 of an average degree of polymerization, and 99.8 mole % of a degree of saponification), 1% by weight of a sodium alginate ("DUCK ALGIN NSPL" made by Kibun Food Chemifa Co.) and 0.3% by weight of a sodium hydrogencarbonate was prepared. The aqueous mixed solution caused a suspension-like phase separation and was white turbid. The phase-separated liquid was fed at a rate of 5 ml/min by a roller pump fitted with a silicon tube having an inner diameter of 4 mm and equipped on the end thereof with a nozzle having an inner diameter of 3 mm, and added dropwise onto a 0.1 mole/l of aqueous calcium chloride solution being stirred with a stirrer. The liquid drops added were with the sodium alginate present at least on their surfaces being solidified in the aqueous calcium chloride solution, precipitated. The obtained solids were spherical.

The spherical solids were immersed in an aqueous solution containing 20 g/l of a formaldehyde, 200 g/l of a sulfuric acid and 100 g/l of a sodium sulfate, at 40° C. for 60 minutes, to undergo coagulation into gel granules simultaneously with acetalization. The acetalized gel granules obtained were washed with water, to yield spherical hydrogel granules having good flexibility and having a diameter of about 5 mm.

Observation of the structure of the obtained gel revealed that the surface layer had a net-like structure formed by entanglement of fiber-like articles having a diameter of about 0.3 to 10 $\mu$m and that the surface layer had a thickness of about 5% of the maximum diameter of the gel. It was also found that there had been formed inside the gel a dense inner layer having a thickness of about 75% of the gel maximum diameter and having micropores with a diameter ranging from about 1 to 10 $\mu$m. It was further found that between the surface layer and the inner layer there had been formed an intermediate layer formed by a multiplicity of finger-like voids orienting from the surface layer toward the inner layer and having a pore diameter of about 100 $\mu$m. The intermediate layer had a thickness of about 20% of the gel maximum diameter.

Embodiment 1

A waste water treatment apparatus as shown in FIG. 1 was constructed by 20 volume % of a PVA hydrogel produced in the reference example 1 in an aerobic filtration tank of 1 m$^3$ and combining with a ultrafiltration membrane made of a polysulfon having 2 mm of an inner diameter of a hollow fiber, 10 m$^2$ of a membrane area and 13000 of an exclusion limit for molecules (6304 membrane made by Kuraray Co.,Ltd.). A waste water having 2500 mg/l of a BOD was supplied to the aerobic filtration tank at a rate of 1 m$^3$/day, an aerobic treatment water was introduced to an inner side of the hollow fiber membrane and a filtration was performed in a cross flow method. When the non-permeating liquid not passing through the membrane module was continuously treated for six months in such a manner as to return to the aerobic filtration tank at a flow amount ten times of that of the permeating liquid passing through the membrane module, the BOD of the treated water was 200 to 300 mg/l and the SS was 0 mg/l, and they were stable. There was hardly any clogging of the membrane and a washing operation of the membrane module was not required at all.

Embodiment 2

A waste water treatment apparatus as shown in FIG. 2 was constructed by 20 volume % of the PVA hydrogel used in the embodiment 1 in the denitrification tank of $0.2 \text{ m}^3$ and the nitrification tank of $0.2 \text{ m}^3$, combining with the same membrane module as that of the embodiment 1 and arranging them in this order from a side of introducing a waste water. A waste water having 200 mg/l of a BOD and 50 mg/l of a total nitrogen was supplied to the denitrification tank at a rate of $1.3 \text{ m}^3/\text{day}$, a nitrifying water was introduced to an inner side of the hollow fiber membrane and a filtration was performed in a cross flow method. When the nitrifying water was returned to the denitrification tank at a flow rate three times of that of the permeating water passing through the membrane module and the non-permeating liquid not passing through the module was returned to the nitrification tank at a flow rate ten times of that of the permeating water, thereby continuously treating for a year, the BOD of the treated water was 6 to 9 mg/l and the SS is 0 to 3 mg/l, and they were stable. There was hardly any clogging of the membrane.

Embodiment 3

A waste water treatment apparatus as shown in FIG. 3 was constructed by disposing a first precipitation tank of $0.5 \text{ m}^3$ in front of the denitrification tank of the embodiment 2 and returning the nitrifying water to the denitrification tank and the first precipitation tank. When a continuous treatment was performed for a year in the same manner as that of the embodiment 2 except that the nitrifying water was returned to the denitrification tank and the first precipitation tank at a flow rate three times of that of the permeating water passing through the membrane module at a rate of 50:50, the BOD of the treated water was 2 to 6 mg/l and the SS was 0 to 3 mg/l, and they were stable. Further, there is hardly any clogging of the membrane.

Embodiment 4

A waste water treatment apparatus as shown in FIG. 4 was constructed by arranging a nitrification tank, a denitrification tank and a membrane module in the order from a side of introducing a waste water. The same PVA gel as that used in the embodiment 1 of 20 volume % was charged in the nitrification tank and the denitrification tank, and the waste water having 200 mg/l of a total nitrogen was supplied to the nitrification tank at a rate of $0.4 \text{ m}^3/\text{day}$. When the non-permeating liquid not passing through the membrane module was returned to the nitrification tank at a flow rate ten times of that of the permeating water passing through the membrane module, thereby performing a continuous treatment for a year, the total nitrogen of the treated water was 10 to 15 mg/l and the SS was 0 to 3 mg/l, and they were stable. Further, there was hardly any clogging of the membrane.

Embodiment 5

A combined purification tank as shown in FIG. 5 was constructed by using a first precipitation tank of $0.5 \text{ m}^3$, a denitrification tank of $0.2 \text{ m}^3$, a nitrification tank of $0.2 \text{ m}^3$ and the same membrane module as that of the embodiment 1. 20 volume % of a polyvinyl formalized hydrogel produced in the reference embodiment 1 was charged in the denitrification tank and the nitrification tank and a waste water for domestic use in 5 persons was supplied to the first precipitation tank at a rate of $1.3 \text{ m}^3/\text{day}$. The nitrifying water was returned to the first precipitation tank and the denitrification tank at a flow rate three times of that of the permeating water passing through the membrane module at a rate of 50:50. Further, when the non-permeating water not passing through the membrane module was returned to the nitrification tank at a flow rate ten times of the permeating water passing through the membrane module and a continuous treatment was performed for a year, the BOD of the treated water was 7 to 10 mg/l and the SS was 0 to 3 mg/l, and they were stable. Further, there was hardly any clogging of the membrane.

COMPARISON EXAMPLE 1

When an operation was performed in the same manner as that of the embodiment 1 except that the aerobic treatment water was wholly filtrated by the membrane module, the clogging was generated in the membrane at eighth day and the operation was hard. When the operation was continued without performing a washing operation of the membrane the treated water overflowed from the aerobic filtration tank, so that the operation was stopped.

Embodiment 6

A waste water treatment apparatus as shown in FIG. 6 was constructed by charging 20 volume % of an acetalized PVA hydrogel produced in the reference example 1 in an aerobic filtration tank of $1 \text{ m}^3$ and combining with a final precipitation tank of $0.6 \text{ m}^3$. When a waste water having 2500 mg/l of a BOD was supplied to the aerobic filtration tank at a rate of $1 \text{ m}^3/\text{day}$ and a continuous treatment was performed for six months, the BOD of the treated water was 200 to 300 mg/l and the SS was 20 to 30 mg/l, and they were stable.

Embodiment 7

A waste water treatment apparatus as shown in FIG. 7 was constructed by charging 20 volume % of the same PVA hydrogel used in the embodiment 6 in a denitrification tank of $0.2 \text{ m}^3$ and a nitrification tank of $0.2 \text{ m}^3$, and combining with a final precipitation tank of $0.6 \text{ m}^3$. When a waste water having 200 mg/l of a BOD and 50 mg/l of a total nitrogen was supplied to the denitrification tank at a rate of 1.3 $\text{m}^3/\text{day}$ and the nitrifying water was returned to the denitrification tank at a flow rate three times of a supernatant water, thereby performing a continuous treatment for a year, the BOD of the treated water was 8 to 10 mg/l and the SS was 10 to 15 mg/l, and they were stable.

Embodiment 8

A waste water treatment apparatus as shown in FIG. 8 was constructed by disposing a first precipitation tank of $0.5 \text{ m}^3$ in front of the denitrification tank of the embodiment 7 and returning the nitrifying water to the denitrification tank and the first precipitation tank. When a continuous treatment was performed for a year in the same manner as that of the embodiment 7 except that the nitrifying water was returned to the denitrification tank and the first precipitation tank at a flow rate three times of that of the supernatant water at a rate of 50:50, the BOD of the treated water was 6 to 9 mg/l and the SS was 6 to 8 mg/l, and they were stable.

Embodiment 9

A waste water treatment apparatus as shown in FIG. 9 was constructed by arranging a nitrification tank, a denitrification tank and a final precipitation tank in the order from a side of introducing a waste water. When the waste water having 200 mg/l of a total nitrogen was supplied to the nitrlfication tank at a rate of 0.4 m³/day, thereby performing a continuous treatment for a year, the total nitrogen of the treated water was 10 to 15 mg/l and the SS was 10 to 20 mg/l, and they were stable.

Embodiment 10

A combined purification tank as shown in FIG. 10 was constructed by using a first precipitation tank of 0.5 m³, an aerobic filtration tank of 0.2 m³ and a final precipitation tank of 0.3 m³. 20 volume % of the same PVA hydrogel as that used in the embodiment 6 was charged in the aerobic filtration tank and a waste water for domestic use in 5 persons was supplied to the first precipitation tank at a rate of 1.3 m³/day, thereby performing a continuous treatment for a year, the BOD of the treated water was 8 to 10 /l and the SS was 10 to 15 mg/l, and they were stable.

Embodiment 11

A combined purification tank as shown in FIG. 11 was constructed by using a first precipitation tank of 0.5 m³, a denitrification tank of 0.2 m³, a nitrification tank of 0.2 m³ and a final precipitation tank of 0.3 m³. 20 volume % of the same PVA hydrogel as that used in the embodiment 6 was charged in the denitrification tank and the nitrification tank and a waste water for domestic use in 5 persons was supplied to the first precipitation tank at a rate of 1.3 m³/day. When the nitrifying water was returned to the denitrification tank and the first precipitation tank at a flow rate three times of that of the supernatant water at a rate of 50:50, thereby performing a continuous treatment for a year, the BOD of the treated water was 6 to 9 mg/l and the SS was 6 to 8 mg/l, and they were stable.

COMPARSION EXAMPLE 2

Figure 12:
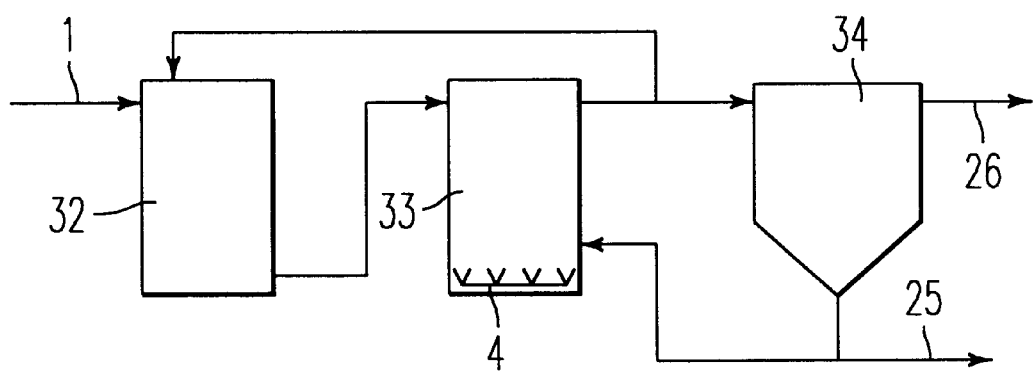
FIG. 12 is a flow chart which shows an organic waste water treatment apparatus in accordance with a prior art.

A waste water treatment apparatus as shown in FIG. 12 was constructed by charging 6000 mg/l of an activated sludge in a denitrification tank of 0.2 m³ and a nitrification of 0.2 m³ and combining with a precipitation tank of 0.3 m³. When a waste water having 200 mg/l of a BOD and 50 mg/l of a total nitrogen is continuously treated at a rate of 1.3 m³/day by returning the nitrifying water to the denitrification tank at a rate three times of that of the supernatant water, the BOD of the treated water was 90 to 120 mg/l and the total nitrogen is 25 to 35 mg/I, so that the water quality was insufficient. Further, the SS concentration of the treated water was high such as 50 to 150 mg/l, so that it was necessary to remove the excessively generated sludge from the precipitation tank once a week so as to maintain the water quality.

REFERENCE EXAMPLE 2

An aqueous suspension solution containing 8% by weight of a PVA made by Kuraray Co.,Ltd. (1700 of an average degree of polymerization, and 99.8 mole % of a degree of saponification), 1% by weight of a sodium alginate and 1% by weight of an activated carbon (P-60) made by Kuraray Chemical Co.,Ltd. was prepared. The aqueous suspension solution was fed at a rate of 5 ml/min by a roller pump fitted with a silicon tube having an inner diameter of 4 mm and equipped on the end thereof with a nozzle having an inner diameter of 3 mm, and added dropwise onto a 0.1 mole/l of aqueous calcium chloride solution being stirred with a stirrer. The liquid drops added were precipitated with being made spherical in the aqueous calcium chloride solution.

The spherical products were immersed in an aqueous solution containing 20 g/l of a formaldehyde, 200 g/l of a sulfuric acid and 100 g/l of a sodium sulfate, at 40° C. for 60 minutes, and thereafter were washed with water, so that spherical hydrogel granules having good flexibility and having a diameter of about 5 mm were obtained. The acetalizing degree of this gel was 39 mole % and the water content was 93%. As a result of observation by an optical microscope and an electron microscope, finger-like voids having a diameter of about 1 μm were innumerably present from the surface of the acetalized PVA carrier to the center portion.

REFERENCE EXAMPLE 3

A hydrogel having a diameter of about 5 mm was obtained by performing the same manner as that of the embodiment 1 except that an aqueous suspension solution containing 8% by weight of a PVA having 4000 of an average degree of polymerization and 99.8 mole % of a degree of saponification, 0.25% by weight of a sodium alginate and 1% by weight of an activated carbon (P-60) made by Kuraray Chemical Co.,Ltd. was used. The acetalizing degree of this carrier was 37 mole % and the water content was 92%. As a result of observation of the carrier by the microscope in the same manner as that of the embodiment 1, the same finger-like voids could be found.

Embodiments 12 and 13

1 l of the carrier obtained in the Reference Embodiments 2 and 3 was charged in the aeration tank of 10 l so as to be aerated, and a waste water having a 100 PPM of TOC was continuously introduced at a rate of 42 ml/min. A metal mesh having an opening of 2 mm was mounted to an outlet of the aeration tank, thereby preventing the carrier from flowing out. The TOC of the treated water after ten days had passed was 8.6 PPM and 7.5 PPM, so that a sufficient treatment has been performed. Thereafter, the carrier was taken out and charged into a sealed container of 20 l, and water of 5 l was supplied therein. An air containing a hydrogen sulfide of 10 PPM was flowed to a gas phase of the container at a rate of 10 l/min, the supply of the air was stopped after 5 minutes had passed, and the container was sealed. After keeping for 15 minutes, the gas phase was taken by a microsyringe and was analyzed by a gas chromatograph, so that a concentration of a hydrogen sulfide was equal to or less than a detection limit.

REFERENCE EXAMPLE 4

A sheet-like product having a thickness of 4 mm was obtained by adding a polymerization initiator comprising 0.5% by weight of an NNN'N'-tetramethylethylenediamine and 0.25% by weight of a potassium persulfate to an aqueous suspension solution comprising 18% by weight of an acrylamide, 1% by weight of a methylene bisacrylamide and 1% by weight of an activated carbon (P-60) made by Kuraray Chemical Co.,Ltd., polymerizing at a room temperature with stirring, and extending. This was cut to a dice shape having a line of 4 mm, thereby forming a carrier. The water content of this carrier was 80%. As a result of observation by the microscope, the activated carbon was dispersed from a portion near the surface of the carrier to the center portion in a substantially uniform manner, however, there was no finger-like voids.

Embodiment 14

When the waste water treatment test was performed in the same manner as that of the embodiments 12 and 13, the TOC was 43.2 PPM and the concentration of a hydrogen sulfide was 0.7 PPM.

In order to confirm an effect of the microbe immobilizing carrier having an activated carbon, a hydrogel having 38 mole % of an acetalization degree and 93% of a water content was obtained by the same method as that of the reference example 2 without using an activated carbon. The same test as the embodiment 12 was performed. With respect to presence of the finger-like voids, the same result as that of the reference examples 2 and 3 was obtained, however, the concentration of a hydrogen sulfide was 8.7 PPM.

In accordance with the invention, there is provided a waste water treatment apparatus which is made compact, excellent in durability, having a high treating performance, and capable of being stably operated for a long time. Further, when the microbe carrier having the acetalized PVA gel is used in the denitrification tank and/or the nitrification tank for the carrier, the waste water can be economically and advantageously treated since the durability of the carrier is excellent. Further, in accordance with the invention, there is provided a waste water treatment apparatus using the carrier having a deodorization performance, thereby being preferably used for the treatment of an organic waste water having a bad smell. The waste water treatment apparatus in accordance with the invention is significantly compact, has a durability and can treat a waste water in a high quality, so that it is preferable for being particularly used as a combined purification tank.

What is claimed is:

1. A waste water treatment apparatus at least comprising a waste water treatment tank in which a carrier particle immobilizing a microbe is charged and which microbe has a property of decomposing and eliminating an organic matter and/or an inorganic matter contained in a waste water, and a membrane module for filtrating a water to be treated which flows out from said treatment tank, wherein water not passing through the membrane of said membrane module is returned and circulated to said treatment tank, wherein the carrier particle immobilizing a microbe is a polyvinyl alcohol hydrogel having a surface layer comprising a net-like structure formed by entanglement of fiber-like articles having a diameter of 0.1 to 50 µm.

2. A waste water treatment apparatus as recited in claim 1, wherein said waste water treatment tank is constituted by a denitrification tank in which a carrier particle immobilizing a denitrifying bacteria is charged and brought into contact with a waste water under an anaerobic condition, and a nitrification tank in which a carrier particle immobilizing a nitrifying bacteria is charged and brought into contact with the waste water under an aerobic condition, these waste water treatment tanks are arranged in the order from a side of introducing the waste water, a nitrifying water flowing out from the nitrification tank is supplied to the membrane module, a part of said treated water is returned and circulated to said denitrification tank, and water not passing through the membrane of said membrane module is returned and circulated to the nitrification tank and/or the denitrification tank.

3. A waste water treatment apparatus as recited in claim 2, wherein a first precipitation tank or an anaerobic filtration apparatus for performing an anaerobic treatment is disposed in front of said denitrification tank, the nitrifying water flowing out from the nitrification tank is supplied to the membrane module, a part of said treated water is returned and circulated to said denitrification tank or the first precipitation tank, or the anaerobic filtration apparatus, and water not passing through the membrane of said membrane module is returned and circulated to the nitrification tank.

4. A waste water treatment apparatus as recited in claim 1, wherein said waste water treatment tank is constituted by a nitrification tank in which a carrier particle immobilizing a nitrifying bacteria is charged and brought into contact with the waste water under an aerobic condition and a denitrification tank in which a carrier particle immobilizing a denitrifying bacteria is charged and brought into contact with a waste water under an anaerobic condition, these waste water treatment tanks are arranged in the order from a side of introducing the waste water, a denitrifying water flowing out from the denitrification tank is supplied to the membrane module, and water not passing through the membrane of said membrane module is returned and circulated to the denitrification tank and/or the nitrification tank.

5. A waste water treatment apparatus as recited in claim 1, wherein said waste water treatment apparatus is a combined purification tank.

6. A waste water treatment apparatus as recited in claim 1, wherein the carrier immobilizing a microbe is a polyvinyl alcohol hydrogel.

7. A waste water treatment apparatus as recited in claim 1, wherein the carrier immobilizing a microbe is an acetalized polyvinyl alcohol hydrogel.

8. A waste water treatment apparatus as recited in claim 1, wherein the carrier immobilizing a microbe is a polyvinyl formal hydrogel.

9. A waste water treatment apparatus as recited in claim 1, wherein the carrier immobilizing a microbe is a carrier having an activated carbon on a surface and/or in an inner portion thereof.

10. A waste water treatment apparatus as recited in claim 1, wherein a membrane used for the membrane module is a membrane of microfiltration area or a membrane of ultrafiltration area.

11. A waste water treatment apparatus as recited in claim 1, wherein a membrane used for the membrane module is a hydrophilic membrane or a membrane being made hydrophilic.

12. A waste water treatment apparatus at least comprising a waste water treatment tank in which a carrier particle immobilizing a microbe is charged and which microbe has a property of decomposing and eliminating an organic matter and/or an inorganic matter contained in a waste water, wherein the carrier particle immobilizing a microbe is an acetalized polyvinyl alcohol hydrogel, wherein said acetalized polyvinyl alcohol hydrogel has a surface layer comprising a net-like structure formed by entanglement of fiber-like articles having a diameter of 0.1 to 50 µm.

13. A waste water treatment apparatus as recited in claim 12, wherein said waste water treatment tank is constituted by a denitrification tank in which a carrier particle immobilizing a denitrifying bacteria is filled and brought into contact with a waste water under an anaerobic condition, and a nitrification tank in which a carrier particle immobilizing a nitrifying bacteria is filled and brought into contact with the waste water under an aerobic condition, these waste water treatment tanks are arranged in the order from a side of introducing the waste water, and a part of a nitrifying water flowing out from the nitrification tank is returned and circulated to said denitrification tank.

14. A waste water treatment apparatus as recited in claim 13, wherein a first precipitation tank or an anaerobic filtration apparatus for performing an anaerobic treatment is disposed in front of said denitrification tank, and a part of the nitrifying water flowing out from the nitrification tank is returned and circulated to said denitrification tank or the first precipitation tank, or the anaerobic filtration apparatus.

15. A waste water treatment apparatus as recited in claim 12, wherein said waste water treatment tank is constituted by a nitrification tank in which a carrier particle immobilizing a nitrifying bacteria is charged and brought into contact with the waste water under an aerobic condition and a denitrification tank in which a carrier particle immobilizing a denitrifying bacteria is charged and brought into contact with a waste water under an anaerobic condition, and these waste water treatment tanks are arranged in the order from a side of introducing the waste water.

16. A waste water treatment apparatus as recited in claim 12, wherein said waste water treatment apparatus is a combined purification tank.

* * * * *